(No Model.) 2 Sheets—Sheet 1.

J. R. LITTLE.
MANUFACTURE OF METAL WHEELS.

No. 406,747. Patented July 9, 1889.

Witnesses:
Jas. E. Hutchinson.
Henry C. Hazard.

Inventor:
Jas. R. Little, by
Pindle & Russell, his Attys.

(No Model.) 2 Sheets—Sheet 2.

J. R. LITTLE.
MANUFACTURE OF METAL WHEELS.

No. 406,747. Patented July 9, 1889.

UNITED STATES PATENT OFFICE.

JAMES R. LITTLE, OF QUINCY, ILLINOIS, ASSIGNOR, BY MESNE ASSIGNMENTS, TO THE QUINCY METAL WHEEL COMPANY, OF SAME PLACE.

MANUFACTURE OF METAL WHEELS.

SPECIFICATION forming part of Letters Patent No. 406,747, dated July 9, 1889.

Application filed June 2, 1884. Serial No. 133,601. (No model.)

*To all whom it may concern:*

Be it known that I, JAMES R. LITTLE, of Quincy, in the county of Adams, and in the State of Illinois, have invented certain new and useful Improvements in the Manufacture of Metal Wheels; and I do hereby declare that the following is a full, clear, and exact description thereof, reference being had to the accompanying drawings, making a part of this specification, in which—

Figure 1:
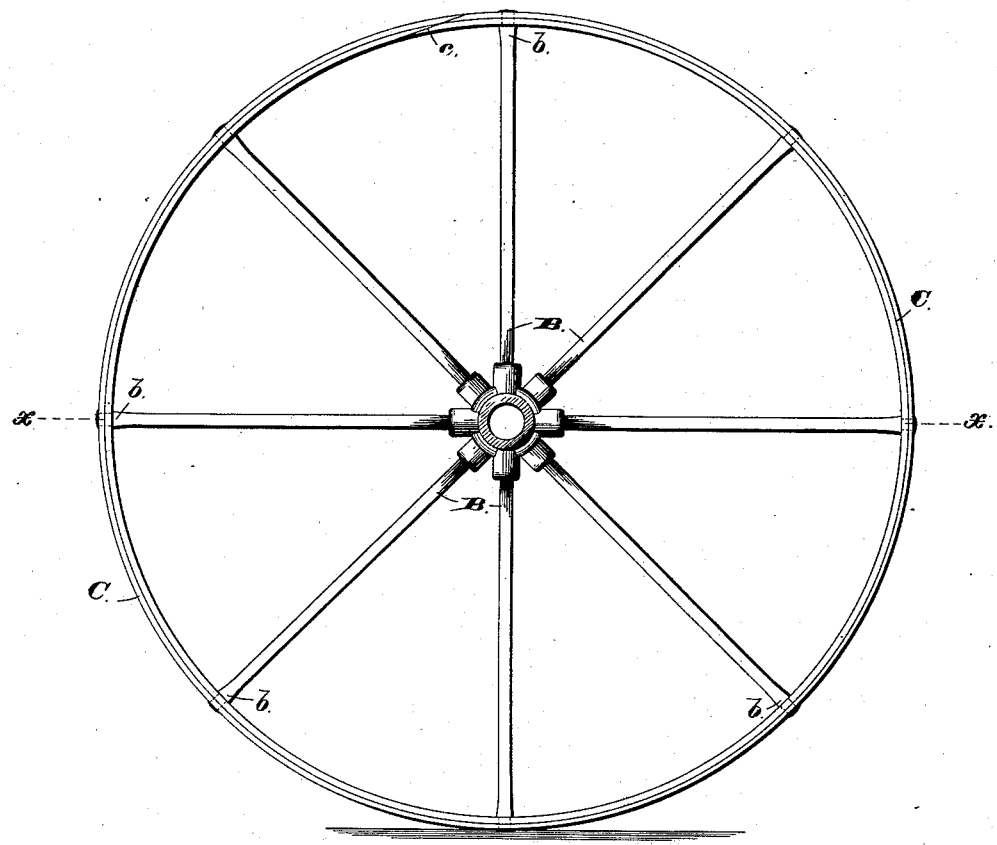
Figure 2:
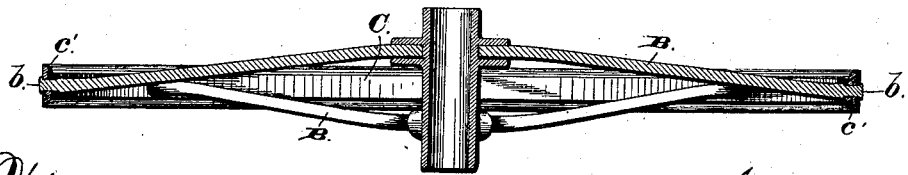
Figure 3:
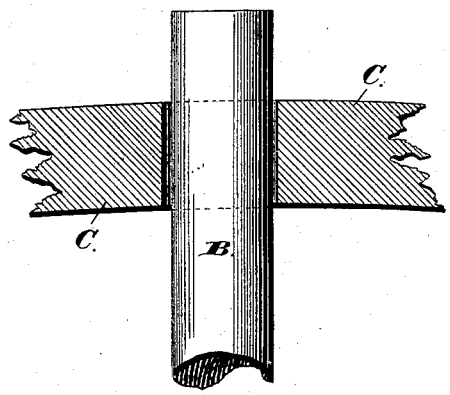
Figure 4:
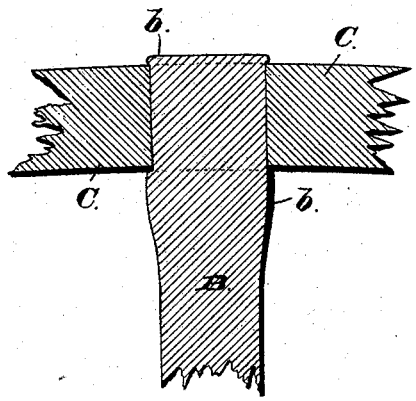

Figure 1 is a side elevation of a wheel constructed in accordance with my improved method. Fig. 2 is a section upon line *x x* of Fig. 1. Fig. 3 is an enlarged transverse section of the rim or felly with a spoke in elevation, showing said parts in relative position for permanent union; and Fig. 4 is a like view of the same after having been united.

Letters of like name and kind refer to like parts in each of the figures.

The design of my invention is to insure in metal wheels a close and permanent connection between the end of a spoke and the part through which the same passes, to which end said invention consists in the method employed for securing a spoke within a connecting part, substantially as and for the purpose hereinafter specified.

In carrying my invention into effect I first secure within a metal hub the inner ends of wrought-iron spokes B, and then place over the outer ends of the latter a metal felly or rim C, which is constructed from wrought-iron, has a diagonal division *c* at one point of its periphery, and has openings or mortises *c'*, of such diameter as to permit each of said spokes to pass easily and freely through the same, with its end projecting slightly beyond the periphery of said rim. The spokes B are now successively secured within the rim C by firmly grasping each spoke at a point near the inner side of said rim and compressing the metal longitudinally between such point and the end of said spoke until it is caused to closely fill the mortise *c'* and an enlargement *b* is formed at each end of the latter. After each of the spokes B has been secured within the rim C the wheel is completed by drawing together and welding the overlapping edges of said rim.

When uniting a spoke to the rim, the longitudinal compression of the former first operates to expand the same within its mortise until the latter is filled to its fullest extent, after which the metal at each end of said mortise is expanded and caused to closely embrace the contiguous inner and outer sides of said rim, so as to render impracticable longitudinal or other motion of said spoke with reference to said rim.

I am aware that metal wheels have heretofore been constructed in which each spoke was passed outward through the rim and the outer projecting end of such spoke riveted down until a head was formed which would resist an outward movement of said rim; but by such method of uniting the parts no provision was made against the inward movement of the rim, and the same was liable to become displaced in such direction under sufficient pressure, while by my method the said parts are so firmly united as to cause them to become practically one and to prevent any independent movement of either.

Having thus fully set forth the nature and merits of my invention, what I claim as new is—

The method of securing a metal spoke within a mortise, which consists in inserting the spoke into the mortise and then expanding the portion contained therein by compressing the same longitudinally between two relatively-movable devices, one of which is adapted to bear against the inner end of said spoke and the other to inclose and grasp said spoke outside of said mortise and to prevent enlargement at the point grasped, substantially as and for the purpose specified.

In testimony that I claim the foregoing I have hereunto set my hand this 7th day of April, A. D. 1884.

JAMES R. LITTLE.

Witnesses:
F. M. McCANN,
JOHN W. RICKART.